United States Patent
Takei et al.

[11] Patent Number: 5,979,772
[45] Date of Patent: Nov. 9, 1999

[54] OPTICAL CARD

[75] Inventors: Jiro Takei, Shinjuku-Ku; Yoshihiro Azuma, Kashiwa, both of Japan

[73] Assignee: Dai Nippon Printing Co., Ltd., Japan

[21] Appl. No.: 08/930,058

[22] PCT Filed: Mar. 21, 1997

[86] PCT No.: PCT/JP97/00935

§ 371 Date: Nov. 20, 1997

§ 102(e) Date: Nov. 20, 1997

[87] PCT Pub. No.: WO97/36293

PCT Pub. Date: Oct. 2, 1997

[30] Foreign Application Priority Data

Mar. 27, 1996 [JP] Japan .................................. 7-072575

[51] Int. Cl.⁶ .................. G11B 7/24; G11B 7/26
[52] U.S. Cl. .............................................. 235/487
[58] Field of Search ............................. 235/487, 488, 235/490, 454

[56] References Cited

U.S. PATENT DOCUMENTS

| | | | |
|---|---|---|---|
| 5,182,743 | 1/1993 | Tinet | 369/275 |
| 5,344,683 | 9/1994 | Shimizu | 428/64 |

FOREIGN PATENT DOCUMENTS

| | | |
|---|---|---|
| 37 24 622 A1 | 1/1988 | Germany . |
| 62-99930 | 5/1987 | Japan . |
| 63-239630 | 10/1988 | Japan . |
| 1-256038 | 10/1989 | Japan . |

Primary Examiner—F. L. Evans
Attorney, Agent, or Firm—Parkhurst & Wendel, LLP

[57] ABSTRACT

This invention relates to an optical card having a preformat portion comprising a low reflectance area having an excellent contrast to high reflectance area. An optical card original plate whose portions corresponding to preformat portions 4, 5 of an optical card 1 each have a stereostructure of an inverted pyramidal shape is prepared. An optical card is duplicated from this optical card original plate. The stereostructure in an inverted pyramidal shape can be formed by the anisotropic etching of a single crystal substrate. An original plate free from defects and surface roughnesses and ensuring a sufficiently low reflectance is obtained. An optical card produced from this original plate has a preformat portion comprising a low reflectance area with a satisfactory contrast to a high reflectance area. A replica duplicated using a molding resin from the original plate can be used as a resin original plate. Furthermore, a replica duplicated from this resin original plate by use of a molding resin can be used as a stamper for production of an optical card.

11 Claims, 9 Drawing Sheets

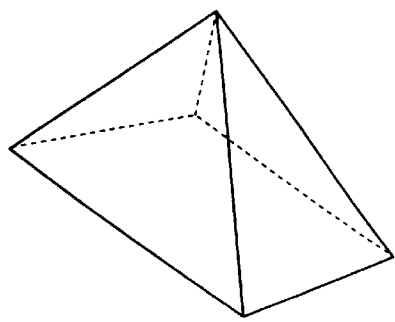
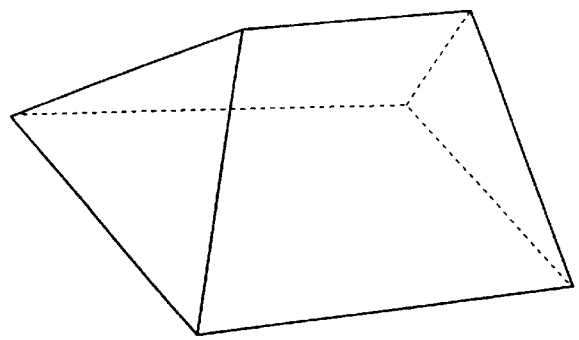
FIG.11A　　　　　　FIG.11B
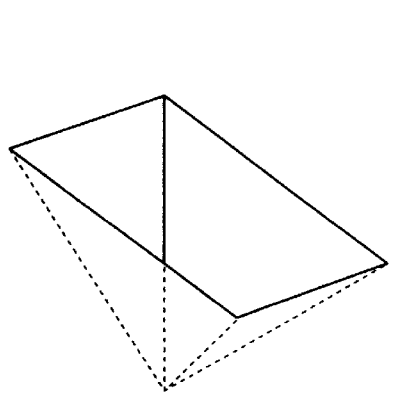
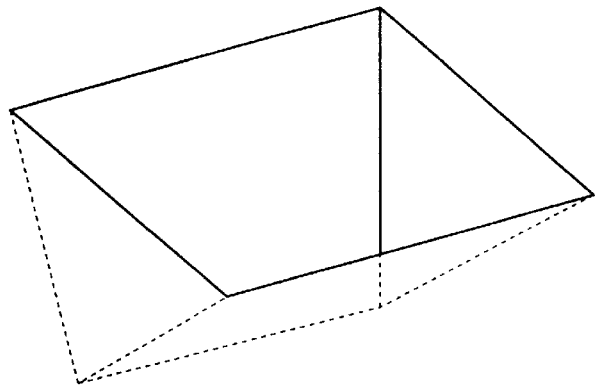
FIG.12A　　　　　　FIG.12B

OPTICAL CARD

BACKGROUND OF THE INVENTION

The invention relates to an optical card capable of optical information recording, and technology for producing it.

An optical card has been known as a memory card incorporating an optical recording zone, i.e., an optical information recording zone, in a plastic card. FIG. 1 shows an example of a WORM (write-once/read-many) type optical card. In an optical recording zone 2 of this optical card 1, track guides 4 and information recording pits 5, each composed of a low reflectance area, are formed as preformats along with high reflectance areas. Among optical cards of this type is an optical card whose low reflectance areas are composed of light scattering surface roughened portions. Such an optical card has been proposed as a product using an optical recording medium whose manufacturing process is relatively simple, whose material is not restricted to a particular optical recording material, and whose production cost is low enough to be suitable for mass reproduction on a commercial scale (see, for example, Japanese Patent Publication No. 64141/95). The production of this optical card begins with the preparation of a surface-roughened original plate having low reflectance areas surface roughened according to an information record pattern. The resulting original plate is duplicated and transferred to mass produce the optical card having a rough surface information record pattern.

The steps for its manufacturing process will be described with reference to the accompanying drawings.

At a first stage, a positive photoresist is uniformly coated on a transparent substrate 11 (a 400 $\mu$m thick acrylic plate) to a thickness of 0.5 $\mu$m by means of a rotary photoresist coater to form a photoresist layer 12, as shown in FIG. 2A. At a second stage as shown in FIG. 2B, a photomask 13 formed in accordance with an information record pattern is superimposed on the photoresist layer 12 using a mask aligner, and then initial exposure (patterning exposure) is performed. At a third stage as shown in FIG. 2C, a glass sheet 14 roughened on one surface in a finely uneven form (average roughness 0.3 $\mu$m, #3000 abrasive glass) is used, and exposure is performed again (surface roughening exposure). After exposure, the photoresist layer 12 is developed at a fourth stage. Thus, as shown in FIG. 2D, the pattern of the photomask 13 is transferred onto the transparent substrate 11, with the exposed areas of the photoresist being dissolved and the unexposed areas remaining. By this measure, the surface roughened photoresist layer 12 is formed as guide tracks, for example, with a width of about 2.5 pm and a pitch of about 15 $\mu$m.

Then, an optical recording medium having an information record pattern composed of low reflectance areas roughened on the surface (a medium as shown in FIG. 2D) is used as a surface roughened original plate 15. From this surface roughened original plate 15, a mother mask is duplicated using a molding press. Specifically, as shown in FIG. 3A, the surface roughened original plate 15 is superimposed on a transparent substrate 21 (an acrylic plate 12 mm in thickness) via an impression material 22 comprising a molding compound of an ionizing radiation curable resin or a thermosetting resin. The combination is pressed, and then the surface roughened original plate 15 is stripped to duplicate a pattern on the transparent substrate 21 side, thus forming a mother mask 23.

Then, the mother mask 23 is used as a duplicating original plate for mass duplication, and impression using it is performed to duplicate an optical recording medium on the back of a substrate serving as a transparent protective layer of an optical card. In detail, as shown in FIG. 4A, a molding resin 33 is interposed between the back of a transparent protective layer 32 having a surface hardening layer 31 and the pattern surface of a mother mask 23. The assembly is pressed by a pressing machine to undergo hardening. Then, as shown in FIG. 4B, the transparent protective layer 32 and the mother mask 23 are released from the mold to duplicate a pattern on the transparent protective layer 32 side. In this manner, high reflectance areas 33a and low reflectance areas 33b are formed on the duplicating resin 33 to serve as an optically transparent substrate for an optical card.

Then, as shown in FIG. 5, an optical recording material layer 34 of, say, the intermediate oxide of Te, is laminated to cover the high reflectance areas 33a and low reflectance areas 33b in the optically transparent substrate composed of the duplicating resin 33.

Separately from the foregoing series of steps, a card substrate 35 as shown in FIG. 6 is prepared. This card substrate is formed by applying a print layer 36 to one surface of a core sheet 35b comprising translucent polyvinyl chloride, and bonding overlay sheets 35a, 35c comprising transparent polyvinyl chloride to both surfaces of the core sheet 35b.

Then, the card substrate 35 is adhesion laminated to the substrate having the optical recording material layer 34 via an adhesive layer 37 comprising urethane resin, as shown in FIG. 7. The so prepared master is punched into a card form to produce an optical card as illustrated in FIG. 1.

The aforementioned production of a conventional surface roughened original plate posed the problem that the resulting roughened surface contained defective areas because of the processing method during production, the limits of the properties of the materials used, and slight changes in the manufacturing conditions. In extreme cases, the resulting original plate partially had no sufficiently low reflectance. Optical cards duplicated from such an original plate were not entirely satisfactory in the contrast of the preformat portions.

DISCLOSURE OF THE INVENTION

The present invention has been accomplished in the light of the above-described problems. Its object is to provide an optical card having a preformat portion comprising a low reflectance area having a satisfactory contrast to a high reflectance area.

To attain this object, the optical card of the present invention is an optical card having a preformat portion comprising a low reflectance area, wherein the low reflectance area comprises stereostructures comprising pyramidal convexes or inverted pyramidal concavities.

Furthermore, an optical card original plate of the invention for use in the production of the above optical card is an original plate for duplicating an optical card substrate bearing an optical recording material layer, wherein the portion corresponding to a preformat portion of an optical card each have a stereostructure (three-dimensional structure) in a pyramidal shape or an inverted pyramidal shape. That is, those portion of the invention each do not show a low reflection pattern by light scattering on a conventional roughened surface A as shown in FIG. 8. Instead, those portions each have a stereostructure B in the shape of an inverted pyramid as shown in FIG. 9. This structure forms a pit pattern in which the surfaces constituting a three-dimensional object comprise mirror surfaces having a particular angle. Because of this pattern, this structure reflects incident light in specific directions other than the direction of incidence. Thus, an excellent contrast in an optical card optical system can effectively be obtained.

BRIEF DESCRIPTION OF THE DRAWINGS

FIGS. 11A and 11B are views showing concrete examples of a pyramidal shape;

FIGS. 12A and 12B are views showing concrete examples of an inverted pyramidal shape.

BEST MODE FOR CARRYING OUT THE INVENTION

Figure 1:
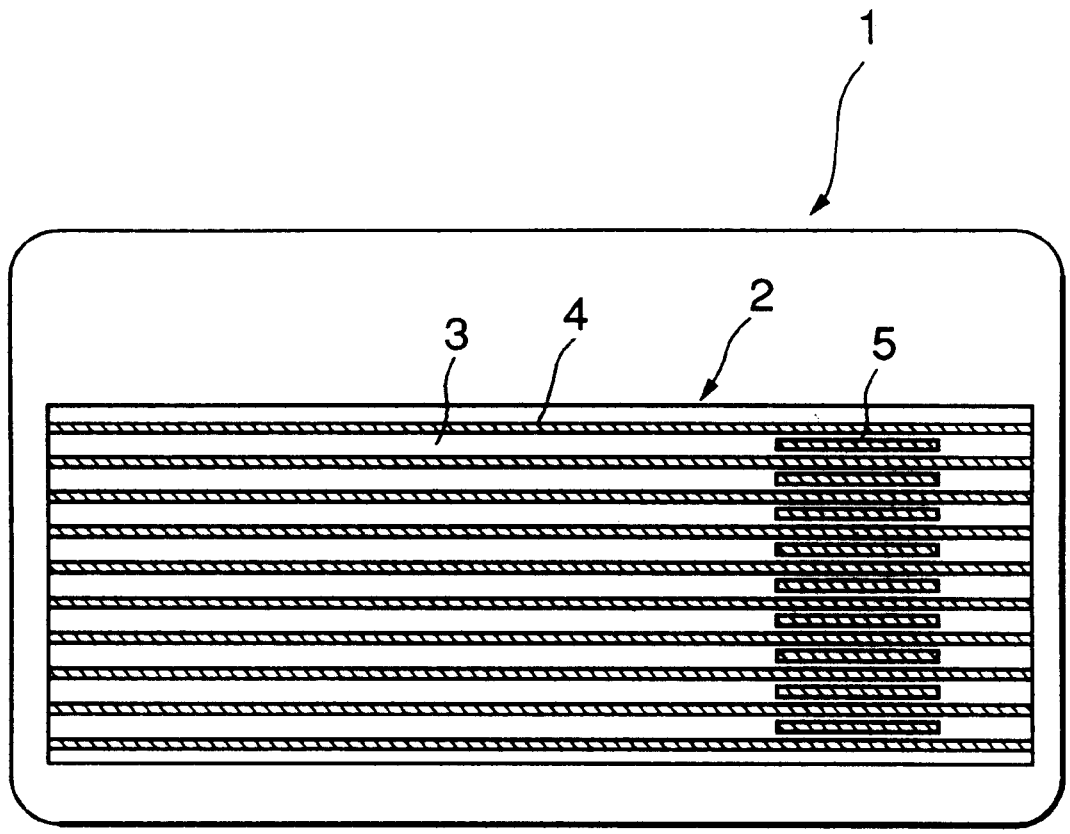
FIG. 1 is an outside drawing showing an example of a WORM type optical card.
Figure 2A:
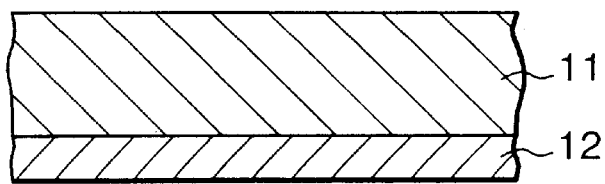
FIGS. 2A to 2D show a process drawing for the preparation of a surface roughened original plate by a conventional method.
Figure 2B:
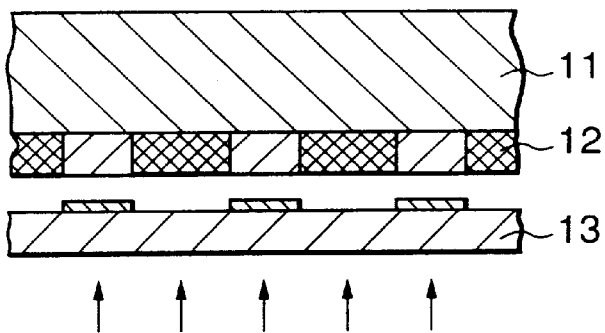
Figure 2C:
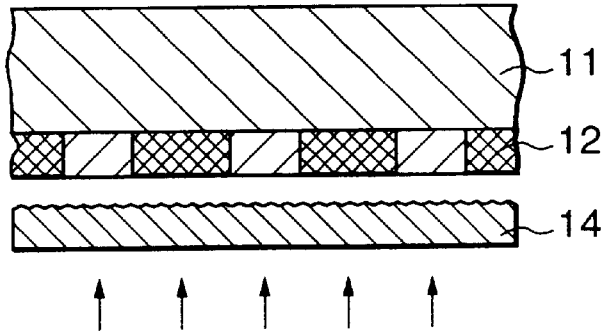
Figure 2D:
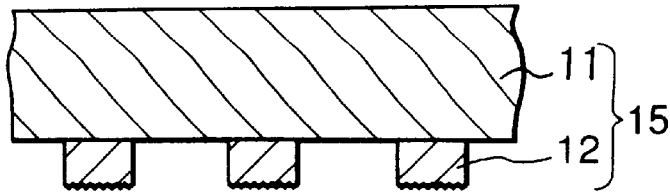
Figure 3A:
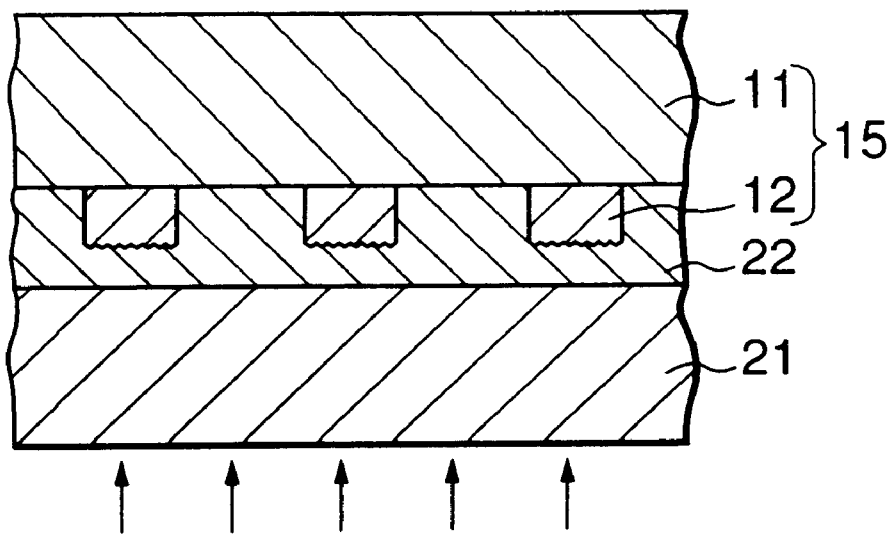
FIGS. 3A and 3B show a process drawing for the preparation of a mother mask from a surface roughened original plate.
Figure 3B:
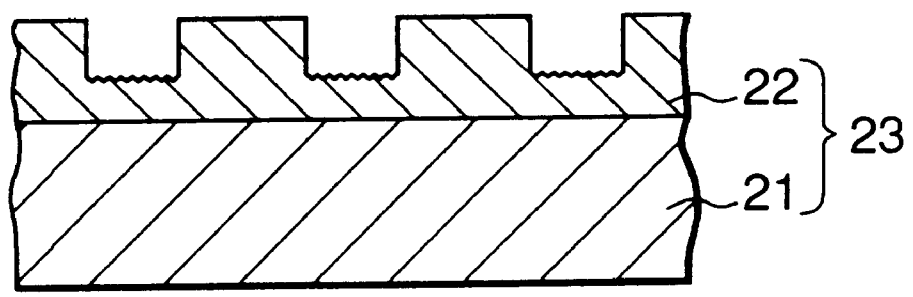
Figure 4A:
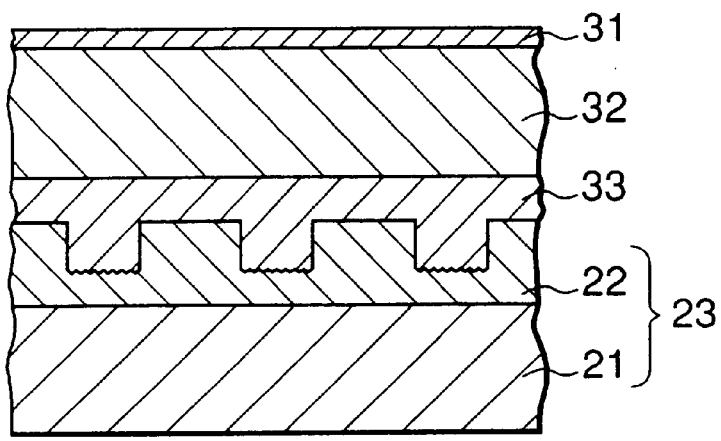
FIGS. 4A and 4B show a process drawing for duplication of an optical recording medium on the back of a substrate which serves as a transparent protective layer.
Figure 4B:
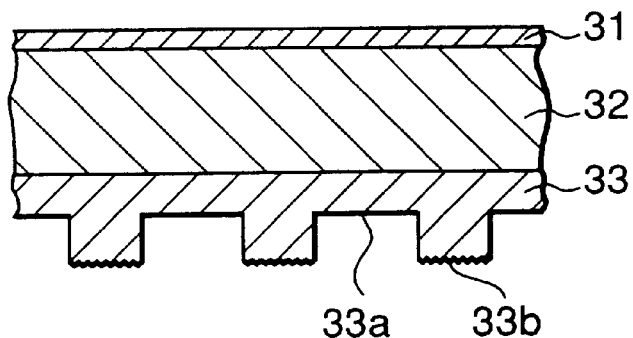
Figure 5:
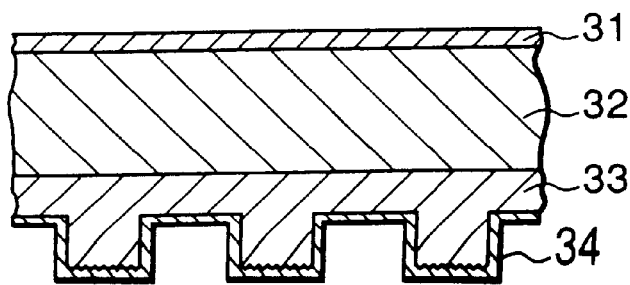
FIG. 5 is a sectional view showing the lamination of an optical recording material layer on a part of an optically transparent substrate.
Figure 6:
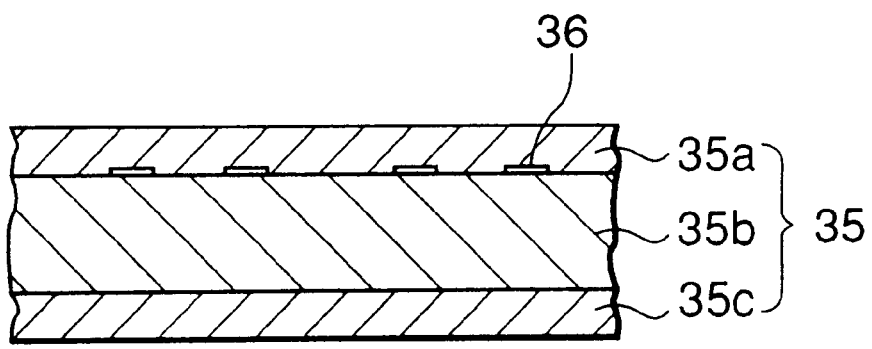
FIG. 6 is a sectional view of a card substrate.
Figure 7:
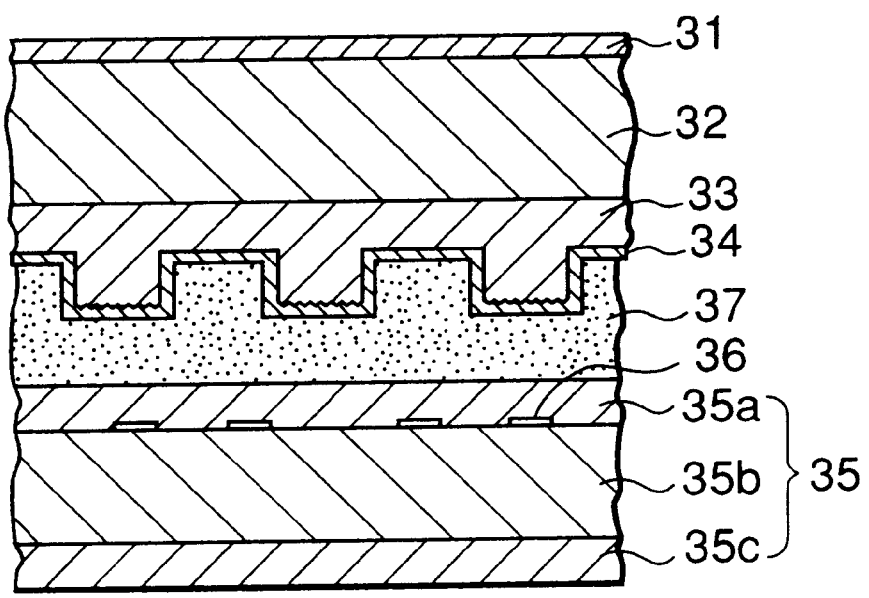
FIG. 7 is a sectional view showing a state in which a card substrate is adhesion laminated to an optically transparent substrate bearing an optical recording material layer via an adhesive layer.
Figure 8:
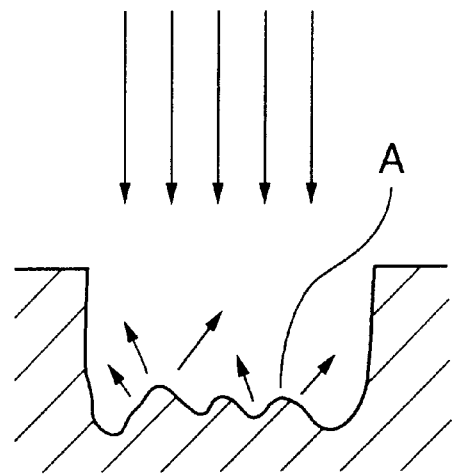
FIG. 8 is a sectional view showing light scattering in a conventional surface roughened pit.
Figure 9:
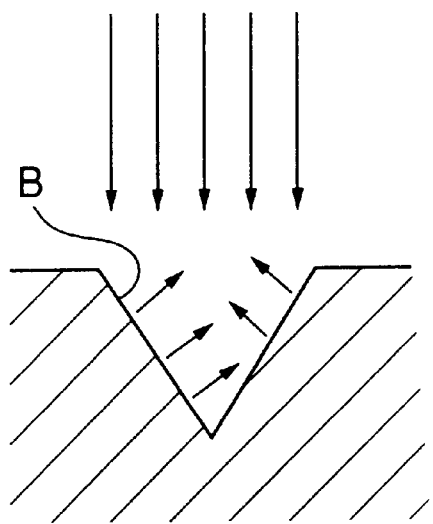
FIG. 9 is a sectional view showing a low reflection pattern by an inverted pyramid-shaped stereostructure.

An optical card original plate for use in the production of the optical card of the present invention will be described, including a method for preparing it.

An optical card original plate according to the present invention is an original plate for duplicating an optical card substrate bearing an optical recording material layer, wherein the portions corresponding to preformat portions of an optical card each have a stereostructure in an inverted pyramid shape. This inverted pyramid-shaped stereostructure can be formed by the anisotropic etching of a single crystal substrate. Generally, when a single crystal silicon substrate is anisotropically etched with an alkali, the etching rate is high on the (100) plane and low on the {111} plane in terms of the Miller indices of the crystal. Assume here that a substrate having the plane of etching comprising the (100) plane is used as generally done in semiconductor fabrication, and this substrate is etched such that the longer-dimension side of a pattern to be etched will be parallel to the <110> plane. In this case, an inverted pyramidal structure comprising four surfaces defined by {111} is automatically formed.

Moreover, a resin original plate for an optical card regarding the invention is obtained by duplication from the above-mentioned optical card original plate by use of a molding resin. Furthermore, a stamper can be formed by duplication from the resulting resin original plate with the use of a molding resin.

An optical card according to the invention which is obtained using the above optical card resin original plate or stamper has preformat portions comprising low reflectance areas for light, the low reflectance areas being composed of pyramid-shaped or inverted pyramid-shaped stereostructures. That is, the aforementioned inverted pyramid-shaped structures produced by the abovementioned anisotropic etching of a single crystal substrate are utilized as the preformat portions of the optical card, whereby low reflectance preformat portions free from defects and surface unevenness can be formed easily and rapidly.

Such a structure is different from a simple V-groove structure which has been studied in a conventional disk-shaped optical disk or the like. The above structure is a pyramidal structure having an inclination also on a plane perpendicular to the direction of scan by an optical pickup. This prevents abnormal reflection of light at the edge of the preformated pit in the scan direction. Thus, read errors for readouts in the pit edge recording method, in particular, can be reduced or prevented. In addition, this pyramidal structure is completely geometrical, so that its inspection and management are easier than conventional surface roughened pits comprising irregular convexes and concavities. Thus, the yield of the resulting product can be increased.

The above-mentioned pyramidal shape (convex state) in the present invention includes the shape of a hipped roof as shown in FIG. 11B in addition to a quadrangular pyramid as illustrated in FIG. 11A. Whereas the inverted pyramidal shape in the present invention includes the shape of an inverted hipped roof as shown in FIG. 12B in addition to an inverted quadrangular pyramid as illustrated in FIG. 12A.

FIGS. 10A to 10G are collectively a process drawing showing the procedure for producing an optical card original plate relevant to the present invention. Preferred embodiments of the invention will be described by way of an explanation for this process drawing.

Figure 10A:
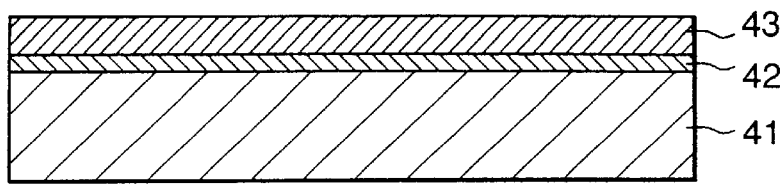
FIGS. 10A to 10G are collectively a process drawing showing a method for producing an optical card original plate relevant to the present invention.

As shown in FIG. 10A, an etching protective film 42 was formed by the customary method to a thickness of about 0.1 μm on a mirror polished (100) single crystal silicon substrate 41 for semiconductor preparation. The etching protective film 42 was composed of thermally oxidized silicon dioxide which is used as a conventional semiconductor protecting film or element separating film. On the etching protective film 42, a positive resist (AZ-5200, Hoechst A.G.) was uniformly coated by rotary coating, and heat-dried to form a resist layer 43 about 0.5 μm in thickness. The heat-drying treatment was performed for about 20 minutes at 150° C. using a hot plate.

Figure 10B:
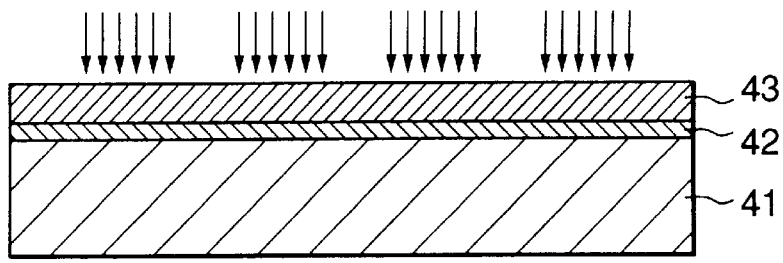
Figure 10C:
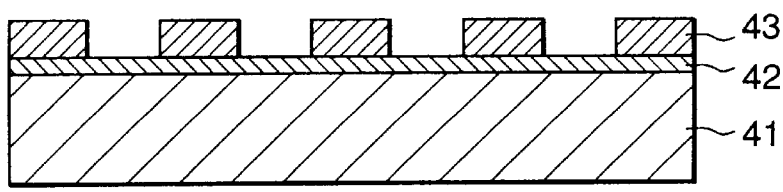

Then, as shown in FIG. 10B, the resist layer 43 was pattern drawn by an ionizing radiation exposure device or a mask aligner in the customary manner. If an EB exposure device is used, this drawing step is performed at an accelerating voltage of 20 kev and an exposure of 10 μC/cm2. Then, the exposed resist layer 43 is dip developed for 1 minute at room temperature in an aqueous solution of an alkali developer consisting essentially of tetramethylammonium hydroxide, and rinsed with flowing deionized water. In the case of one-operation transfer using a mask aligner or the like, an exposure of 50 mJ/cm2 by a metal halide lamp is used. Subsequent development and rinsing steps are the same as in the above. By the above-described process, the desired resist pattern was formed as shown in FIG. 10C. Then, the composite was heat-treated for 30 minutes at 120° C. in an oven to enhance the adhesion between the resist layer 43 and the etching protective layer 42.

Figure 10D:
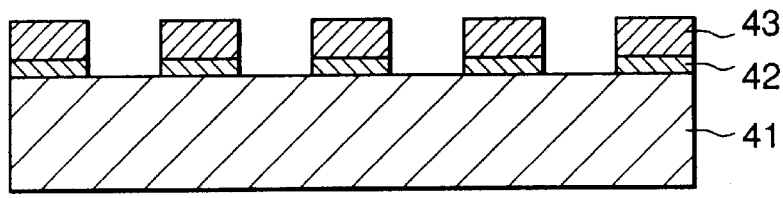

Then, as shown in FIG. 10D, the etching protective film 42 exposed to the outside through the opening of the patterned resist layer 43 was removed by dry etching. The dry etching was performed by a parallel planar electrode type RIE dry etching device under the following conditions: 0.1 mTorr, $CHF_9$—93 sccm, $O_2$—7 sccm and 0.2 $W/cm^2$. Before etching of the etching protective film 42, a descumming treatment with oxygen plasma is performed if desired. This treatment is performed for 1 minute using the same etching device under the conditions: 0.2 mTorr, $O_2$_100 sccm and 0.1 $W/cm^2$.

Figure 10E:
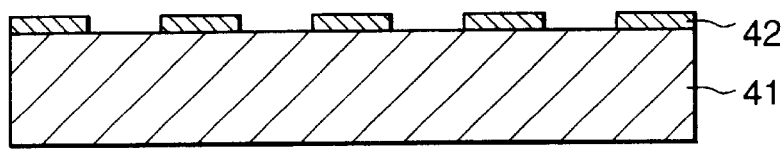

Then, as shown in FIG. 10E, the patterned resist layer 43 was peeled off with a solvent. The peeling was performed ultrasonically for 3 minutes at 60° C. using a peeling solution consisting essentially of ethanolamine, and then rinsed with deionized water. After peeling of the resist layer 43, the substrate was washed by an ordinary washing device for a semiconductor substrate.

Figure 10F:
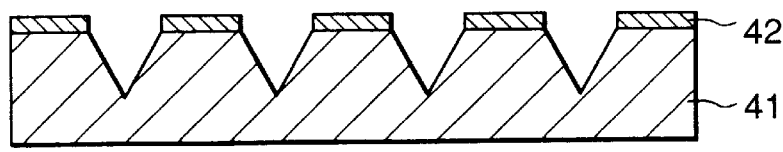

Then, as shown in FIG. 10F, patterning of the single crystal silicon substrate 41 was carried out by wet etching. Concretely, the wet etching was performed for 3 minutes at 70° C. using a 10 wt. % aqueous solution of potassium hydroxide. The amount of etching at this time was about 3 $\mu$m. The etched product was rinsed with deionized water, and dried.

Of importance here are the crystal orientation of the single crystal silicon substrate 41 and the dimensions of the pattern to be formed. Generally, when a single crystal silicon substrate is anisotropically etched with an alkali, the etching rate is high on the (100) plane and low on the {111} plane in terms of the Miller indices of the crystal. Also, the etching rate for a single crystal silicon substrate depends on the impurity concentration of boron contained in the crystal, and decreases as the boron concentration increases. To obtain an inverted pyramidal structure by the anisotropic etching of a single crystal silicon substrate, therefore, it is vital to use an n-type single crystal silicon substrate having the plane of etching comprising the (100) plane as generally used in semiconductor production, and make the longer-dimension side of a pattern to be etched parallel to the <110> plane.

The etched side surface comprises the {111} plane. Thus, to give an inverted pyramidal structure and avoid the formation of a planar portion at the bottom of the etched surface, the etching time needs to be about 1.5 times that for the shorter-dimension of the etching pattern.

Figure 10G:
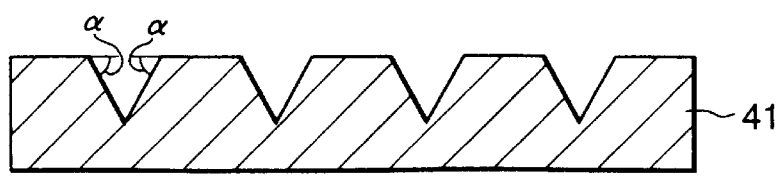

Finally, as shown in FIG. 10G, the patterned etching protective film 42 is removed by dry etching if desired. The dry etching is preferably performed under the same conditions as those for the aforementioned etching of the etching protective film 42 exposed to the outside. If desired, a descumming treatment with oxygen plasma is performed as a final treatment. The conditions for this treatment are the same as stated previously. With this treatment, the procedure for manufacture of an optical card original plate is completed. The bottom angle a of each of the two equal sides in the so obtained optical card original plate shown in FIG. 10G was 54.7° C.

The succeeding procedure until the production of an optical card may be the same as described earlier.

A single crystal substrate is itself a relatively expensive material. From the above optical card original plate comprising a single crystal substrate, therefore, a replica may be duplicated using a molding resin for use in the preparation of an optical card. This replica per se may be used as a resin original plate for an optical card. Furthermore, a replica duplicated from this resin original plate by use of a molding resin may be used as a stamper for an optical card.

The pyramidal structure may be concave or convex relative to the transparent protective layer of the optical card. In either case, the same effect is obtained. To improve the duplication properties or plate wear of the resin original plate, various suitable coating agents may be applied to the duplicating surface.

A plurality of the above-described stampers are put together to form a multi-plane stamper, whereby optical card production can be made more efficient. An example of the method for preparing such a multi-plane stamper is to tie together a plurality of mother stampers to form a multi-plane mother stamper, and use this multi-plane mother stamper as a source of duplication to form a multi-plane stamper. A preferred example of this multi-plane formation will be described below.

A plurality of silicon wafers cut to about the size of one surface of the desired optical card are arranged on a substrate so as to have the same crystal orientation, and they are fixed there. Then, the combination is molded using resin or molten glass for integration. Thereafter, the composite is polished until the surface of each of the silicon wafers arranged on the substrate is exposed to the outside. Then, a photosensitive material is coated thereon, and a pattern is drawn in the coated assembly by contact exposure through a multi-plane photomask or directly by ionizing radiation. The patterned product is etched to obtain a multi-plane original plate. From this multi-plane original plate, a multi-plane stamper can be produced by the aforementioned method.

Figure 13A:
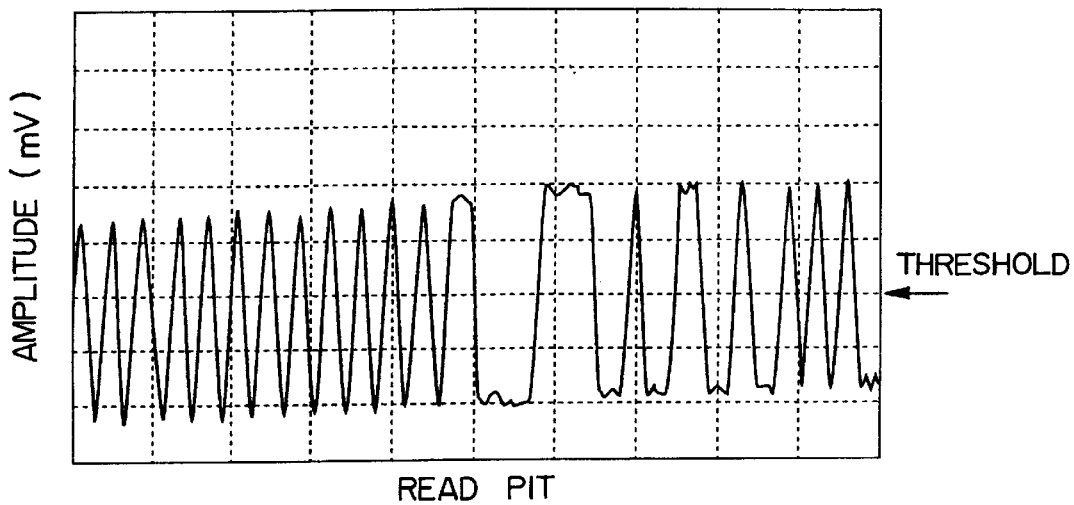
FIGS. 13A and 13B are the waveforms of read signals in the preformat portions of optical cards related to the present invention and the prior art, respectively.
Figure 13B:
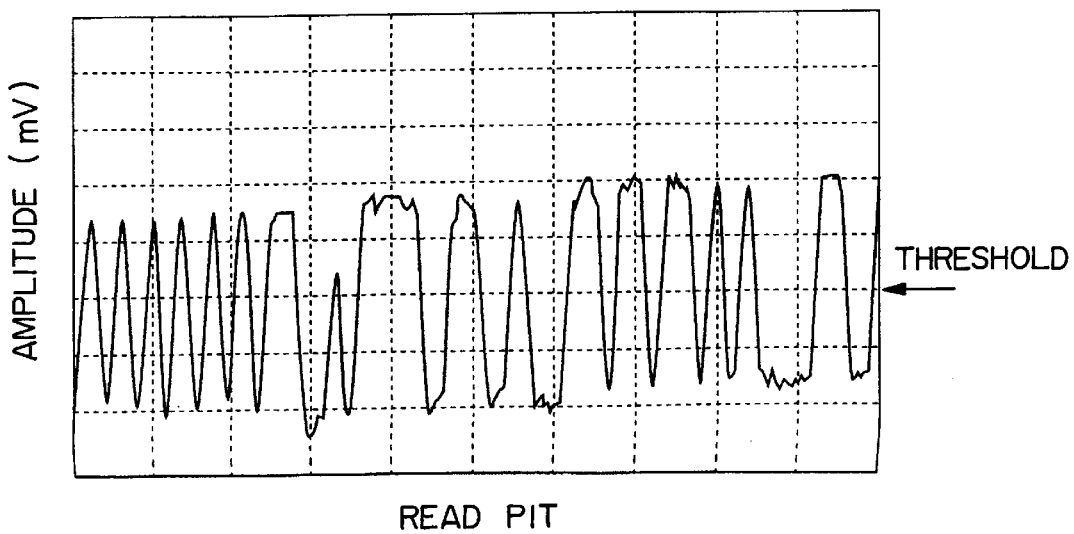

A comparison was made between the reader/writer output signal waveforms in the preformat portions of the optical card of the present invention obtained by the above-described method and an optical card obtained by the aforementioned conventional surface roughening method. The results are shown in FIG. 13A (the invention) and FIG. 13B (the conventional product). The waveforms indicated are based on records of pit lengths. In the optical card of the invention illustrated in FIG. 13A, the maximum amplitude (1,370 mV) of the signal waveform is large and stable, showing no error signals. In the reader/writer output signal waveform in the preformat portion of the optical card obtained by the conventional surface roughening method illustrated in FIG. 13B, the maximum amplitude is 1,170 mV, showing an error signal exceeding the signal threshold value at the portion indicated by an arrow.

The present invention has been described based on the preferred embodiments. The method for preparation of the original plate, etc. stated in the present specification is intended for illustration only, and is not to be restricted to the materials, devices or conditions used there. The dry etching conditions, in particular, are strongly affected by the etching apparatus, the structure of the etching chamber and so on. The wet etching conditions are also influenced by the etching area and the amount of the etching solution. Thus, these conditions are not limited to the aforementioned conditions.

As described above, the optical card original plate of the invention has not conventional surface roughened structures, but inverted pyramid-shaped stereostructures whose respective surfaces are mirror surfaces. Thus, the original plate is defectless and free from surface roughnesses, and so ensures a sufficiently low reflectance. An optical card produced from this optical card original plate has preformat portions comprising low reflectance areas with a satisfactory contrast to high reflectance areas. The manufacturing process for this optical card is different from the manufacturing process for a conventional optical card solely in the step of preparing the counterpart of a surface roughened original plate. Thus, the procedure of the invention is advantageous in that a conventional duplication technique can be utilized as such without making the process complicated.

We claim:

1. An optical card having a preformat portion comprising a low reflectance area, wherein the low reflectance area being composed of a stereostructure comprising a convex in pyramidal shape or a concavity in an inverted pyramidal shape.

2. The optical card of claim 1, wherein the pyramidal shape includes the shape of a hipped roof.

3. The optical card of claim 1, wherein discrete fine stereostructures comprising the convexes or concavities are formed in a predetermined preformat pattern.

4. The optical card of claim 1, wherein the preformat comprises ROM data and/or pregroup.

5. The optical card of claim 1, wherein a transparent protective layer is further formed on an optical recording material layer containing the preformat portion.

6. The optical card of claim 1, wherein the optical card is a WORM card.

7. An optical card original plate which is an original plate for duplicating an optical card substrate and whose portion corresponding to a preformat portion of an optical card has a stereostructure in an inverted pyramidal shape.

8. The optical card original plate of claim 7, wherein the stereostructure in an inverted pyramidal shape is formed by the anisotropic etching of a single crystal substrate.

9. A resin original plate for an optical card, said resin original plate being duplicated from the original plate according to claim 7 by use of a molding resin.

10. A stamper for an optical card, said stamper being duplicated from the resin original plate for an optical card according to claim 8 by use of a molding resin.

11. A multi-plane stamper comprising an assembly of a plurality of the stampers for an optical card according to claim 10.

* * * * *